United States Patent
Jiang

(10) Patent No.: US 12,018,817 B1
(45) Date of Patent: Jun. 25, 2024

(54) FASTENING COMPONENT FREE FROM ELECTROCHEMICAL CORROSION AND STAGE LIGHT FIXTURE WITH SAME

(71) Applicant: Guangzhou Haoyang Electronic Co., Ltd., Guangzhou (CN)

(72) Inventor: Weikai Jiang, Guangzhou (CN)

(73) Assignee: GUANGZHOU HAOYANG ELECTRONIC CO., LTD., Guangzhou (CN)

( * ) Notice: Subject to any disclaimer, the term of this patent is extended or adjusted under 35 U.S.C. 154(b) by 0 days.

(21) Appl. No.: 18/128,727

(22) Filed: Mar. 30, 2023

(30) Foreign Application Priority Data

Feb. 28, 2023   (CN) .......................... 202320341024.8

(51) Int. Cl.
    *F21V 19/00*    (2006.01)
    *F21V 15/01*    (2006.01)
    *F21W 131/406*  (2006.01)

(52) U.S. Cl.
    CPC .............. *F21V 15/01* (2013.01); *F21V 19/00* (2013.01); *F21W 2131/406* (2013.01)

(58) Field of Classification Search
    CPC .. F16B 33/04; F16B 33/008; F16B 2043/008; F16B 5/02; F16B 5/0241; F16B 5/0258; F16B 5/0283; F21V 19/0055
    USPC ....................................................... 362/257
    See application file for complete search history.

(56) References Cited

U.S. PATENT DOCUMENTS

| | | | |
|---|---|---|---|
| 7,011,435 B1 * | 3/2006 | Blaymore | F21V 21/15 362/382 |
| 2006/0088398 A1 * | 4/2006 | Lund | F16B 5/0225 411/398 |
| 2009/0064454 A1 * | 3/2009 | Anderson | E05D 5/14 16/2.1 |
| 2011/0064539 A1 * | 3/2011 | Ghatikar | E04F 13/0837 411/371.2 |
| 2018/0238372 A1 * | 8/2018 | Villet | F16B 19/10 |
| 2019/0348897 A1 * | 11/2019 | Garcia-Herreros | F16B 37/122 |
| 2020/0025237 A1 * | 1/2020 | Brun | F16B 43/00 |
| 2020/0072271 A1 * | 3/2020 | Couderc | F16B 5/02 |
| 2022/0001973 A1 * | 1/2022 | Block | B64F 5/10 |

(Continued)

FOREIGN PATENT DOCUMENTS

FR          3038942 A1 *  1/2017  ............... B64F 5/10

*Primary Examiner* — Christopher M Raabe
(74) *Attorney, Agent, or Firm* — Muncy, Geissler, Olds & Lowe, P.C.

(57) ABSTRACT

A fastening component free from electrochemical corrosion includes a first fastening plate, a second fastening plate, and a fastening screw connecting them. A screw shaft of the fastening screw is penetrated through a first fastening hole of the first fastening plate and entered the second fastening hole of the second fastening plate. A head of the fastening screw is abutted against the first fastening plate and is sleeved with an isolation member for electrochemical corrosion protection. The isolation member includes an annular spacer located between the lower end face of the head and the first fastening plate, and a first segment surrounding the side wall of the head and connected to the annular spacer, and upper end face of the first segment is higher than or flush with the upper surface of the first fastening plate or the upper end face of the head in a smaller height.

13 Claims, 3 Drawing Sheets

(56) References Cited

U.S. PATENT DOCUMENTS

2023/0258215 A1\* 8/2023 Muntz ................ F16B 19/1045
29/525.03

\* cited by examiner

FASTENING COMPONENT FREE FROM ELECTROCHEMICAL CORROSION AND STAGE LIGHT FIXTURE WITH SAME

CROSS REFERENCE TO RELATED APPLICATIONS

The present application claims priority from Chinese Invention Application No. CN 202320341024.8 filed on Feb. 28, 2023, all of which are hereby incorporated herein by reference.

TECHNICAL FIELD

The present invention relates to the technical field of stage light fixtures, and more particularly, relates to a fastening component free from electrochemical corrosion and a stage light fixture with the same.

BACKGROUND

When used in outdoor, stage light fixtures are required to have waterproof performance. Current waterproof stage light fixture is generally formed as a housing in aluminum alloy, which is provided with a waterproof strip at the fastened position thereof to achieve waterproof performance. However, such housing of the stage light fixture is usually fastened with fastening screws made of iron material, which may cause corrosion during actual use of the current products, even if being painted, the problem of corrosion still cannot be effectively solved. Moreover, the whole housing will be corroded quickly due to spreading after local corrosion of the housing, which greatly affects the appearance and performance of the products.

SUMMARY

It is therefore an object of the present invention to provide a fastening component which is free from the aforesaid drawbacks of the prior art. The fastening component of the present invention can effectively eliminate electrochemical corrosion between a fastening plate and a fastening screw to prevent the fastening plate from corrosion.

According to the present invention, the fastening component includes a first fastening plate, a second fastening plate, and a fastening screw connecting the first fastening plate with the second fastening plate. The first fastening plate and the second fastening plate are respectively provided with a first fastening hole and a second fastening hole corresponding to the fastening screw. A screw shaft of the fastening screw is penetrated through the first fastening hole and inserted in the second fastening hole, and a head of the fastening screw is abutted against the first fastening plate. The head is sleeved with an isolation member for preventing the first fastening plate and the fastening screw from electrochemical corrosion, which includes an annular spacer between the lower end face of the head and the first fastening plate, and a first segment surrounding the side wall of the head and connected to the annular spacer. The upper end face of the first segment is higher than or flush with the upper surface of the first fastening plate or the upper end face of the head in a smaller height.

The fastening component according to the present invention isolates the first fastening plate from the fastening screw via the isolation member, such isolation member includes the annular spacer between the lower end face of the head and the first fastening plate, and the first segment surrounding the side wall of the head and connected to the annular spacer, and the upper end face of the first cylinder segment being higher than or flush with the upper surface of the first fastening plate or the upper end face of the head in a smaller height. In such a way, after falling on the fastening component, rainwater will be insulated by the isolation member and will not be able to establish an electrical connection between the head and the first fastening plate, thereby eliminating electrochemical corrosion between the head and the first fastening plate, and protecting the first fastening plate against corrosion.

Given that the magnesium alloy has a low density and a high hardness, which can reduce the mass of the first fastening plate, and the iron material or copper material is a common material for the fastening screw, the first fastening plate may be made of a magnesium alloy material, and the fastening screw may be made of an iron material or copper material.

The isolation member may be an insulator according to the present invention. As the insulator can avoid electrical connection between the fastening screw and the first fastening plate through the isolation member, thus not resulting in electrochemical corrosion under the action of impure rainwater.

The isolation member may also be made of a plastic material, due to the features of being commonly used, with high hardness and good wear resistance, and being often used as the material of a spacer.

Additionally or alternatively, the isolation member may be made of hard materials. In such way, it can avoid damage of the fastening screw to affect the service life thereof when being twisted during fastening in the process of repeatedly disassembling and assembling the fastening screw.

According to the present invention, in order to avoid water permeating through the gap between the first fastening plate and the fastening screw to generate electrical connection therebetween, the isolation member further includes a second segment sleeving the outside of the screw shaft, such second segment is connected to the annular spacer. The gap between the first fastening plate and the fastening screw thus can be sealed by at least one of the annular spacer and the second segment.

The upper surface of the first segment is higher than the upper end face of the head. Such configuration can completely eliminate possible electrical connection between the head and the first fastening plate through water droplets.

According to the present invention, in a bid to prevent the head from protruding too much from the first fastening plate, the first fastening hole forms a first hole segment and a second hole segment corresponding to the head and the screw shaft respectively, so that the first hole segment may fully or partially accommodate the head.

The head is preferably completely accommodated in the first hole segment, the surface of the first fastening plate thus is smooth and looks more attractive.

According to the present invention, the first fastening plate may be further provided with a water discharging hole or water discharging groove in communication with the end of the first hole segment close to the second hole segment, which can avoid water permeating in the second hole segment or the second fastening hole, after the water is accumulated in the first hole segment for a long time.

If the screw shaft does not penetrate out of the second fastening hole, the screw shaft will not establish an electrical connection with the second fastening plate to generate electrochemical corrosion therebetween as long as water not permeating through the gap between the fastening screw and the first fastening plate. Therefore, the second fastening hole forms as a blind hole.

To prevent rainwater accidentally permeating through the first fastening hole to the second fastening hole, a sealing ring is provided around the screw shaft between the first fastening plate and the second fastening plate, according to the present invention.

On the other aspect, the present invention further provides a stage light fixture, which includes the fastening component described above to avoid electrochemical corrosion at joints of the stage light fixture.

The light fixture further includes a light head, a support arm supporting the light head to rotate, and a case supporting the support arm to rotate. The first fastening plate may form a housing of the light head, the support arm, or the case, and the housing is fastened/fixed by the fastening component. The head of the fastening screw may be located outside the housing.

DETAILED DESCRIPTION

Figure 1:
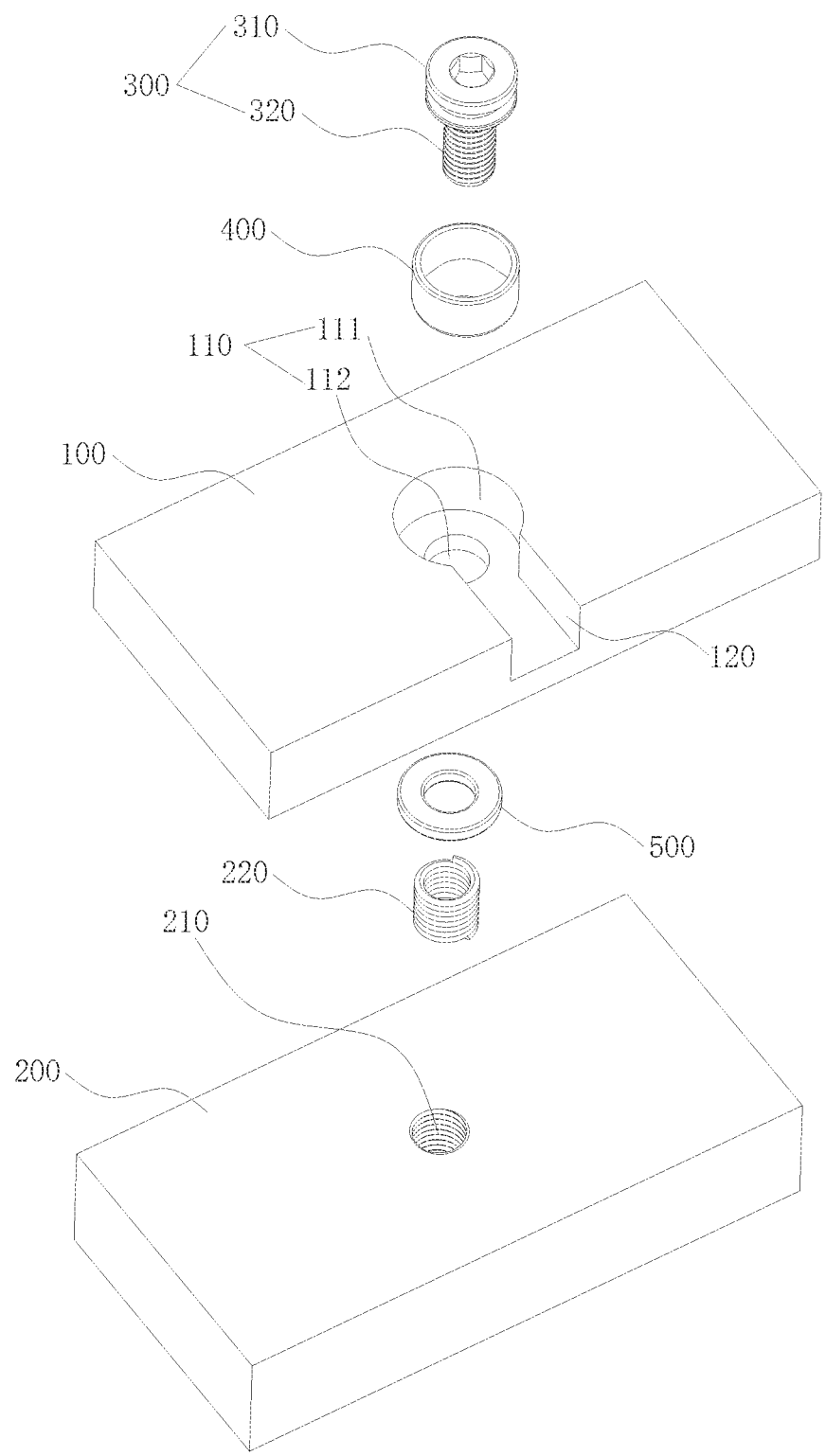
FIG. 1 is an exploded view of a fastening component according to the present invention.

The accompanying drawings are for exemplary illustration only, and should not be construed as limitations on this patent; in order to better illustrate this embodiment, some parts in the accompanying drawings may be omitted, enlarged or reduced, and they do not represent the size of the actual product; for those skilled in the art, it is understandable that certain well-known elements and descriptions thereof in the drawings may be omitted. The positional relationship described in the drawings is only for exemplary illustration, and should not be construed as limitations on this patent.

Figure 2:
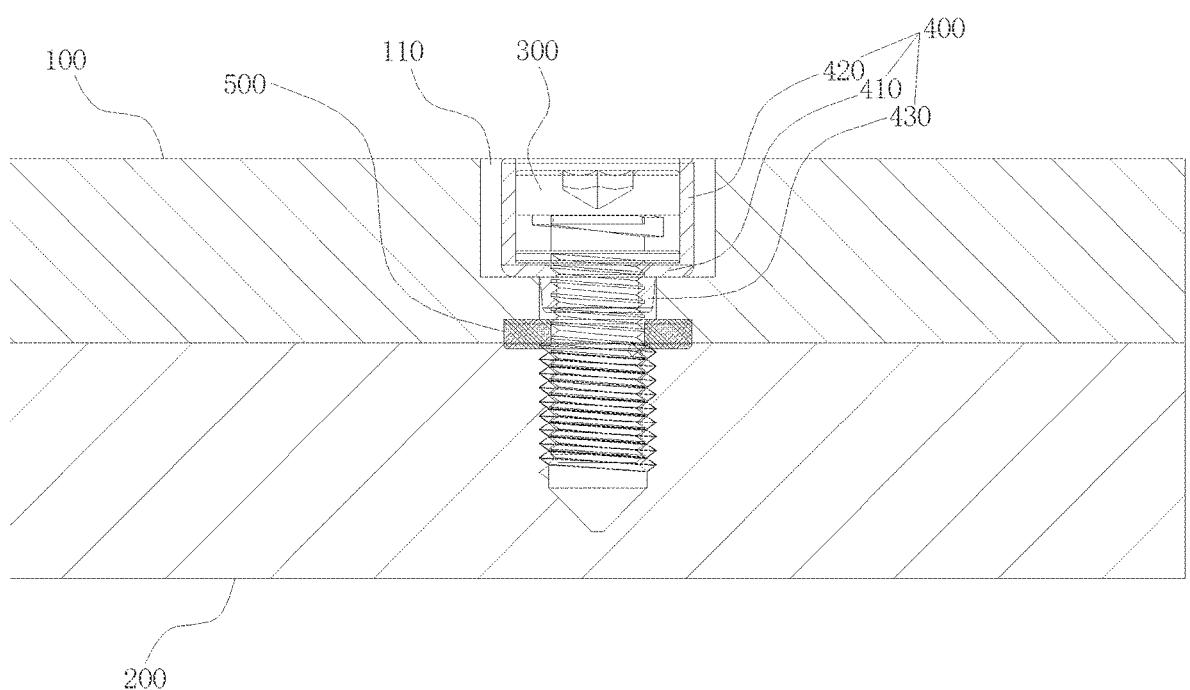
FIG. 2 is a cross-sectional view of the fastening component according to the present invention.

FIG. 1 and FIG. 2 shows a fastening component free from electrochemical corrosion according to an embodiment of the present invention, which includes a first fastening plate 100, a second fastening plate 200, and a fastening screw 300 connecting the first fastening plate 100 with the second fastening plate 200. The first fastening plate 100 and the second fastening plate 200 are respectively provided with a first fastening hole 110 and a second fastening hole 210 corresponding to the fastening screw 300. A screw shaft 320 of the fastening screw 300 is penetrated through the first fastening hole 110 and screwed in the second fastening hole 210 until that a head 310 of the fastening screw 300 is abutted against the first fastening plate 100. The head 310 is sleeved with an isolation member 400 for preventing the first fastening plate 100 and the fastening screw 300 from electrochemical corrosion. The isolation member 400 has an annular spacer 410 between the lower end face of the head 310 and the first fastening plate 100, and a first segment 420 surrounding the side wall of the head 310 and connected to the annular spacer 410. The shape of the first segment is associated with the shape of the head 310, such as a shape of cylinder in the present embodiment, or a shape of barrel. The upper end face of the first segment 420 is higher than or flush with the upper surface of the first fastening plate 100 or the upper end face of the head 310 in a smaller height.

The fastening component according to the present invention isolates the first fastening plate 100 from the fastening screw 300 via the isolation member 400, which includes the annular spacer 410 located between the lower end face of the head 310 and the first fastening plate 100, and the first segment 420 surrounding the side wall of the head 310 and connected to the annular spacer 410, and the upper end face of the first segment 420 being higher than or flush with the upper surface of the first fastening plate 100 or the upper end face of the head 310 in a smaller height. In this way, after falling on the fastening component, rainwater will be insulated by the isolation member and will not be able to establish an electrical connection between the head 310 and the first fastening plate 100, thereby eliminating electrochemical corrosion between the head and the first fastening plate, and protecting the first fastening plate 100 against corrosion.

Additionally or alternatively, a waterproof ring is provided at the position where the first fastening plate 100 and the second fastening plate 200 are fastened, and the first fastening hole 110 and the second fastening hole 210 are located inside the waterproof ring.

According to a preferred embodiment of the present invention, the first fastening plate 100 may be made of a magnesium alloy material, and the fastening screw 300 may be made of an iron material or copper material. The magnesium alloy has a low density and a high hardness, which can reduce the mass of the first fastening plate 100. The iron material or copper material is a common material for the fastening screw 300.

Additionally or alternatively, the isolation member 400 may be made of an aluminum material, which is similar to a magnesium alloy, iron and copper in chemical activity, and is not prone to electrochemical corrosion.

In a preferred embodiment of the present invention, the isolation member 400 may be an insulator. The insulator can avoid electrical connection between the fastening screw 300 and the first fastening plate 100 through the isolation member 400, not resulting in electrochemical corrosion under the action of impure rainwater.

The isolation member 400 may be also made of a plastic material. The plastic material is commonly used, with high hardness and good wear resistance, and is often used as the material of a spacer.

In the embodiment shown in FIG. 1 and FIG. 2, the isolation member 400 includes a polyamide 66 material.

The isolation member 400 may further be made of hard materials. It can avoid damage thereof to affect the service life when being twisted during fastening in the process of repeatedly disassembling and assembling the fastening screw 300.

The isolation member 400 may further include a second segment 430 sleeving outside of the screw shaft 320 and connected to the annular spacer 410. The shape of the second segment is associated with the screw shaft 320, such as a shape of cylinder in the present embodiment, or a shape of barrel. A gap between the first fastening plate 100 and the fastening screw 300 is sealed by at least one of the annular spacer 410 and the second segment 430, in order to avoid water permeating through the gap to establish an electrical connection between the first fastening plate 100 and the fastening screw 300. In a configuration that the second segment 430 is not included, i.e., only the annular spacer 410 is included, the annular spacer 410 is configured to seal the gap between the first fastening plate 100 and the fastening screw 300, while in the configuration that the second segment 430 is further included, the gap between the first fastening plate 100 and the fastening screw 300 is sealed by either one or both of the annular spacer 410 and the second segment 430.

Additionally or alternatively, the outer diameter of the second segment 430 gradually decreases in a direction close to the second fastening plate 200. Such configuration can serve as guidance.

In the present embodiment, the second segment 430 is in an interference fit with the screw shaft 320.

In a preferred embodiment of the present invention, the upper surface of the first segment 420 is higher than the upper end face of the head 310, which can completely eliminate possible electrical connection between the head 310 and the first fastening plate 100 through water droplets. Preferably, the upper surface of the first segment 420 is higher than the upper end face of the head 310 by 2 mm.

The first fastening hole 110 forms a first hole segment 111 and a second hole segment 112 corresponding to the head 310 and the screw shaft 320 respectively. The first hole segment 111 may fully or partially accommodate the head 310 to prevent the head 310 from protruding too much from the first fastening plate 100.

In a preferred embodiment of the present invention, the head 310 is completely accommodated in the first hole segment 111.

The first fastening plate 100 may be further provided with a water discharging hole or water discharging groove 120 in communication with the end of the first hole segment 111 close to the second hole segment 112. Such configuration can avoid water permeating in the second hole segment 112 or the second fastening hole 210, after the water is accumulated in the first hole segment 111 for a long time.

Preferably, the water discharging groove 120 extends in a direction perpendicular to the first fastening hole 110.

In a preferred embodiment of the present invention, the second fastening hole 210 is a blind hole, which means that the screw shaft 320 does not penetrate out of the second fastening hole 210, so that the screw shaft 320 will not establish an electrical connection with the second fastening plate 200 to generate electrochemical corrosion therebetween as long as water not permeating through the gap between the fastening screw 300 and the first fastening plate 100.

In the present embodiment, a threaded bushing 220 is provided in the second fastening hole 210, which is in a threaded connection with the fastening screw 300.

Between the first fastening plate 100 and the second fastening plate 200, a sealing ring 500 may be disposed around the screw shaft 320. The sealing ring 500 can prevent rainwater accidentally permeating through the first fastening hole 110 to the second fastening hole 210.

The first fastening plate 100 is provided with an accommodating groove corresponding to the sealing ring 500 for accommodating the sealing ring 500.

Figure 3:
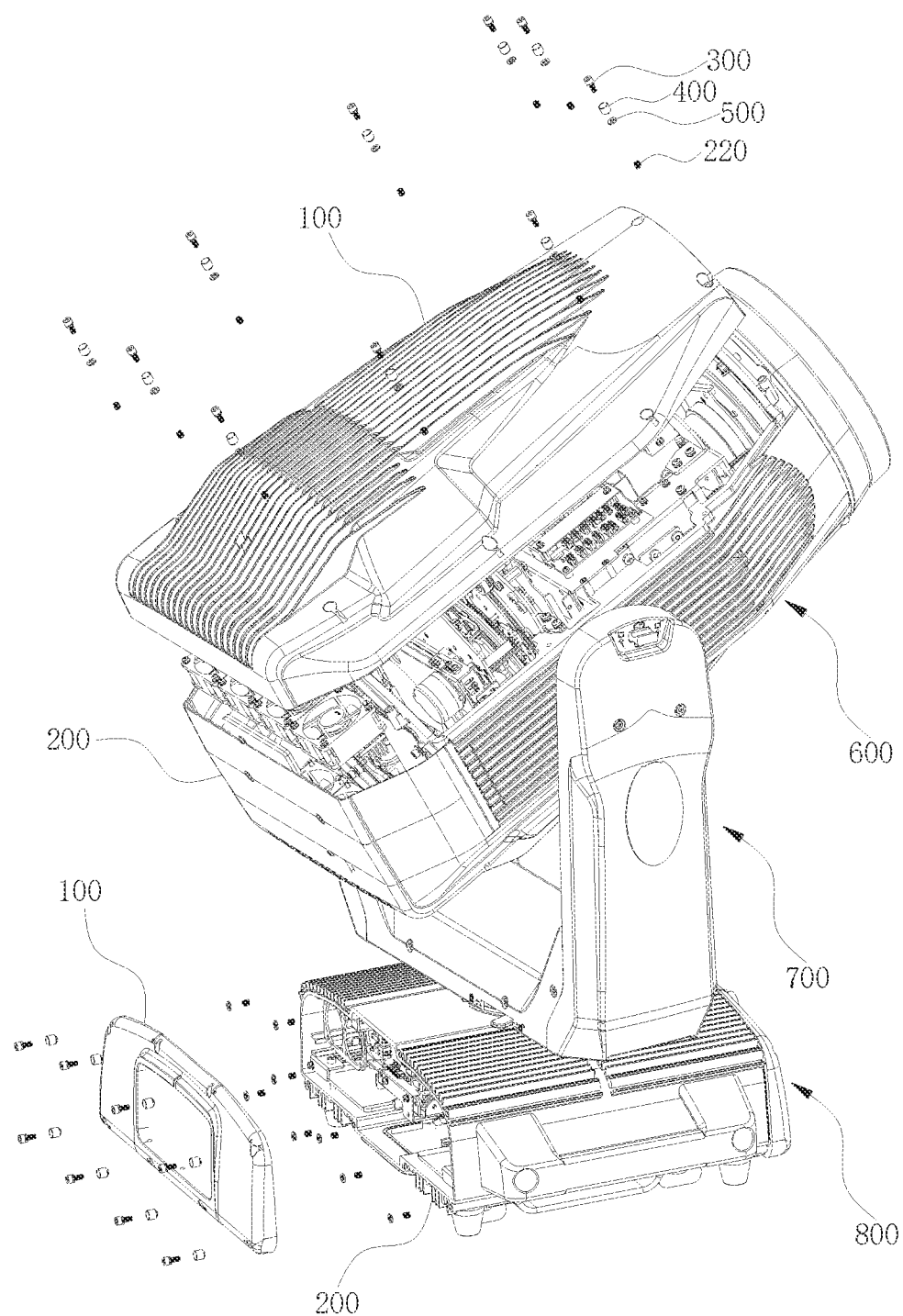
FIG. 3 is an exploded view of a stage light fixture according to the present invention.

FIG. 3 provides a stage light fixture, which includes the fastening component according to each embodiment described above to avoid electrochemical corrosion at joints of the stage light fixture.

As shown in FIG. 3, the light fixture may further include light head 600, a support arm 700 supporting the light head 600 to rotate, and a case 800 supporting the support arm 700 to rotate. The first fastening plate 100 may form a housing of the light head 600, the support arm 700, or the case 800, and the housing is fastened/fixed by the fastening component. The head 310 of the fastening screw 300 may be located outside the housing.

Optionally, the second fastening plate 200 may be a housing of the light fixture head 600, the support arm 700 or the case 800, in this case, the housing is fastened by the fastening component. The second fastening plate 200 may also be a sheet metal in the light fixture head 600, the support arm 700 or the case 800, in this case, the housing is fixed by the fastening component.

Obviously, the above-mentioned embodiments of the present invention are only examples for clearly illustrating the present invention, rather than limiting the implementation modes of the present invention. For those of ordinary skill in the art, changes or modifications in other different forms can also be made on the basis of the above description. It is not needed and it is impossible to list all implementation modes here. Any modifications, equivalent replacements and improvements made within the spirit and principles of the present invention shall be included within the protection scope of the claims of the present invention.

The invention claimed is:

1. A fastening component free from electrochemical corrosion, comprising
   a first fastening plate;
   a second fastening plate; and
   a fastening screw connecting the first fastening plate with the second fastening plate, the first fastening plate and the second fastening plate being respectively provided with a first fastening hole and a second fastening hole corresponding to the fastening screw, a screw shaft of the fastening screw being penetrated through the first fastening hole and entered the second fastening hole, and a head of the fastening screw being abutted against the first fastening plate,
   wherein the head is sleeved with an isolation member for preventing the first fastening plate and the fastening screw from electrochemical corrosion, the isolation member comprises
      an annular spacer between a lower end face of the head and the first fastening plate,
      a first segment surrounding a side wall of the head and connected to the annular spacer; and
      a second segment sleeving outside of the screw shaft inside the first fastening plate and connected to the annular spacer inside the first fastening plate,
      wherein an upper end face of the first segment is higher than or flush with an upper surface of the first fastening plate or an upper end face of the head in a smaller height.

2. The fastening component according to claim 1, wherein the first fastening plate is made of a magnesium alloy material, and the fastening screw is made of an iron or copper material.

3. The fastening component according to claim 1, wherein the isolation member is in form of an insulator.

4. The fastening component according to claim 3, wherein the isolation member is made of a plastic material.

5. The fastening component according to claim 1, wherein the isolation member is made of hard materials.

6. The fastening component according to claim 1, wherein the upper end face of the first segment is higher than the upper end face of the head.

7. The fastening component according to claim 1, wherein the first fastening hole forms a first hole segment and a second hole segment corresponding to the head and the screw shaft respectively.

8. The fastening component according to claim 7, wherein the head is completely accommodated in the first hole segment.

9. The fastening component according to claim 7, wherein the first fastening plate is further provided with a water discharging hole or water discharging groove in communication with an end of the first hole segment close to the second hole segment.

10. The fastening component according to claim 1, wherein the second fastening hole is a blind hole.

11. The fastening component according to claim 1, wherein between the first fastening plate and the second fastening plate, a sealing ring is arranged around the screw shaft.

12. A stage light fixture, comprising the fastening component according to claim 1.

13. The stage light fixture according to claim 12, further comprising a light head, a support arm supporting the light head to rotate, and a case supporting the support arm to rotate, wherein the first fastening plate forms a housing of the light head, the support arm, or the case, the housing is fastened/fixed by the fastening component, and a head of the fastening screw is located outside the housing.

* * * * *